United States Patent [19] | [11] 4,071,848
Leeper | [45] Jan. 31, 1978

[54] THINNED APERIODIC ANTENNA ARRAYS WITH IMPROVED PEAK SIDELOBE LEVEL CONTROL

[75] Inventor: David Garth Leeper, Middletown, N.J.

[73] Assignee: Bell Telephone Laboratories, Incorporated, Murray Hill, N.J.

[21] Appl. No.: 745,231

[22] Filed: Nov. 26, 1976

[51] Int. Cl.$^2$ ........................ H01Q 21/00; H04B 7/00
[52] U.S. Cl. ............................... 343/844; 343/100 LE
[58] Field of Search ................. 343/100 LE, 853, 854, 343/844

[56] References Cited

U.S. PATENT DOCUMENTS

| | | | |
|---|---|---|---|
| 3,130,410 | 4/1964 | Gutleber | 343/844 |
| 3,182,330 | 5/1965 | Blume | 343/844 |
| 3,605,106 | 9/1971 | Gutleber | 343/844 |
| 3,780,372 | 12/1973 | Unz | 343/844 |
| 3,811,129 | 5/1974 | Holst | 343/844 |
| 3,877,033 | 4/1975 | Unz | 343/844 |
| 3,978,482 | 8/1976 | Williams et al. | 343/11 |

OTHER PUBLICATIONS

*IEEE Trans Antennas & Propagation*, vol. AP-20, No. 2, Mar. 1972, pp. 129–136, B. D. Steinberg, *The Peak Sidelobe of the Phased Array Having Randomly Located Elements.*

*Valley Forge Research Center Quarterly Progress Report*, No. 14, Aug. 15, 1975, *An Approach to Peak Sidelobe Control in Moderately Thinned Aperiodic Arrays*, by Leeper, D. G. pp. 47–64.

*Primary Examiner*—Eli Lieberman
*Assistant Examiner*—Harry Barlow
*Attorney, Agent, or Firm*—Erwin W. Pfeifle

[57] ABSTRACT

The present invention relates to thinned linear, planar and three-dimensional phased antenna array configurations which have the antenna or sensor elements positioned in a pseudorandom manner as prescribed by the equation based on difference sets. The present antenna array permit thinning factors well below one-half while retaining the sidelobe level characteristics of arrays with much higher thinning factors.

7 Claims, 9 Drawing Figures

(TYPICAL PRIOR ART RANDOM ARRAY)

TYPICAL DIFFERENCE SET ARRAY

THINNED APERIODIC ANTENNA ARRAYS WITH IMPROVED PEAK SIDELOBE LEVEL CONTROL

BACKGROUND OF THE INVENTION

1. Field of the Invention

The present invention relates to thinned aperiodic antenna arrays with improved peak sidelobe level control and, more particularly, to thinned aperiodic antenna arrays having the antenna elements pseudorandomly positioned within the array in a manner prescribed in accordance with an equation based on difference sets to provide improved peak sidelobe level control.

2. Description of the Prior Art

A variety of array antennas are well known in the prior art and include several types. One type is the linear phased array antenna of which the simplest design is the "filled" periodic array which comprises a line of antenna elements with equal excitation power and with an interelement spacing typically of approximately one-half wavelength of the transmitted or received signal. The cost of large linear phased array antennas can be reduced through "thinning" which corresponds to a reduction in the number of elements in the aperture below that of the filled array, and, in turn, an interelement spacing of more than one-half wavelength. However, the more a linear phased array is thinned the less control is generally available to a designer of the radiation pattern in the sidelobe region, which in turn influences the level of the peak sidelobe.

Radiation patterns in slightly thinned linear phased arrays have been improved somewhat by the nonuniform spacing of the reduced number of elements in accordance with certain equations. In this regard see, for instance, U.S. Pat. Nos. 3,130,410 and 3,605,106 issued to F. S. Gutleber on Apr. 21, 1964 and Sept. 14, 1971, respectively, and U.S. Pat. Nos. 3,780,372 and 3,877,033 issued to H. Unz on Dec. 18, 1973 and Apr. 8, 1975, respectively.

U.S. Pat. No. 3,182,330 issued to A. E. Blume on May 4, 1965 improves the radiation pattern by variably spacing the elements of a linear array in accordance with a definite relationship which either progressively spaces the elements further apart or closer together as the distance from a reference point increases. In accordance with the Blume arrangements, echelon lobes usually accompanying components of the radiation in undesired radiation directions are reduced.

U.S. Pat. No. 3,978,482 issued to F. C. Williams et al on Aug. 31, 1976 relates to a dynamically focused thinned linear array which employs variation of a local oscillator frequency together with differential path lengths in the local oscillator lines feeding the various mixer elements at each antenna element along the receiving array to dynamically program the focus of the thinned array. The differential path length spacings between any adjacent pairs of antenna elements varies linearly so that the total path length distribution from the local oscillator to the mixers (assuming a similar distance between each of the mixers and its corresponding antenna element) varies nonlinearly over the entire array.

Some additional sidelobe control may be obtained by applying unequal excitations to the antenna elements. The principle disadvantage of this approach is that the gain of the array will necessarily be less than an array in which full power is applied to all elements.

As described above, thinning can be accomplished by spacing the reduced number of elements either uniformly or nonuniformly in a prescribed manner in the aperture. Another method for thinning a filled linear array using the nonuniform spacing of elements is to randomly locate the reduced number of elements in the aperture. A number of such random designs are then evaluated and the design providing the lowest peak sidelobe is selected. In this regard see the articles "The Peak Sidelobe of the Phased Array Having Randomly Located Elements" by B. D. Steinberg in *IEEE Transactions on Antennas and Propagation*, Vol. AP-20, No. 2, March 1972 at pp. 129-136 and "An Approach to Peak Sidelobe Control in Moderately Thinned Aperiodic Arrays" by D. G. Leeper in the *Valley Forge Research Center Quarterly Progress Report*, No. 14, Aug. 15, 1975 at pp. 47-64.

While the equations presented in the above-cited patents produce a number of either small-array designs (10s of elements) or larger nearly-filled arrays with well-controlled peak sidelobe level (PSL) control, the published patterns often showed sidelobes similar in character and level to those of random arrays described in the articles mentioned hereinabove. The similarity has led some designers to conclude that significant sidelobe control may be unobtainable in significantly thinned aperiodic arrays (thinning factor well below one-half).

BRIEF SUMMARY OF THE INVENTION

The present invention relates to thinned aperiodic arrays of equally excited antenna elements with improved peak sidelobe level (PSL) control and, more particularly, to thinned aperiodic antenna arrays having antenna elements pseudorandomly positioned within the array in a manner prescribed in accordance with an equation based on difference sets to provide improved peak sidelobe level control.

It is an aspect of the present invention to provide thinned aperiodic linear, planar and three-dimensional phased antenna arrays which have peak sidelobe level control capabilities which equal thinned aperiodic phased antenna arrays incorporating many more antenna elements. Such aspect effectively permits severely thinned aperiodic antenna arrays to be built with peak sidelobe level control comparable to that previously achieved with more moderately thinned aperiodic antenna arrays.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

The present invention relates to thinned aperiodic antenna arrays wherein the antenna elements are located within the array as specified most accurately by the known equation based on difference sets, a topic from combinatorial mathematics. For a better understanding of the present invention and the advantageous results obtained therefrom, the following description will describe, in sequence, the general linear array grid, a prior art "filled" array, a typical prior art thinned aperiodic linear array wherein antenna elements are randomly spaced, and a typical thinned aperiodic linear array in accordance with the present invention.

Figure 1:
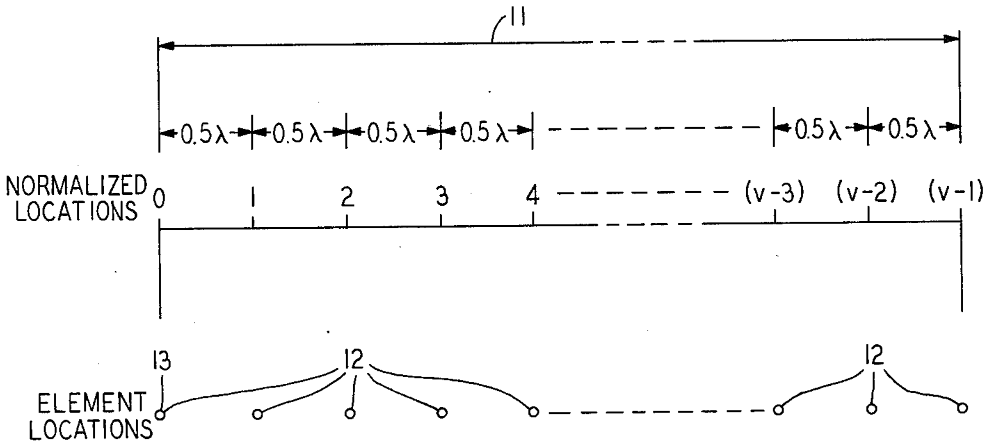
FIG. 1 (PRIOR ART)
FIG. 1 is a diagrammatic illustration of a general prior art linear array element location grid.

Referring now to FIG. 1, a general linear array element location grid is shown having an aperture 11, or length, of $(\nu-1)$ half wavelengths $(0.5\lambda)$, where the element locations 12 may be specified as normalized distances from the origin 13 of the grid and $\lambda$ is the wavelength of the radiation to be transmitted or received by the array. More particularly, a location designated, for example, 3.0 will define an element location $1.50\lambda$ $(3.0 \times 0.5)$ from origin 13 while a location designated, for example, 3.3 will define an element location $1.65\lambda$ from origin 13, etc. Additionally, a particular set of $k$ array element locations may be mathematically specified by a set D of $k$ numbers, where $$D = \{d_1, d_2, d_3, \ldots, d_k\} \quad (1)$$

The well-known "filled" array is defined as an array for which $$D \equiv D_f = \{0, 1, 2, \ldots, (\nu-1)\} \quad (2)$$

such that $k = \nu$ and an element is positioned at each integer element location 12 within the grid of FIG. 1. An example of a "filled" array, which will be used hereinafter for comparison with other linear arrays, would be where $\nu = k = 85$ and an element is placed in each of integer locations 0–84 in FIG. 1.

Thinned arrays are generally defined as arrays wherein $k < \nu$ which advantageously reduces the cost and the mutual coupling between elements by using less elements but also disadvantageously reduces the control of the peak sidelobe level (PSL). The present invention relates to thinned arrays wherein all the elements have equal gain or excitation power and especially to thinned arrays for which $$\beta \equiv k/\nu \leqq \tfrac{1}{2} \quad (3)$$

where $\beta$ is the thinning factor, and for which a uniformly low peak sidelobe level is desired.

Figure 2:
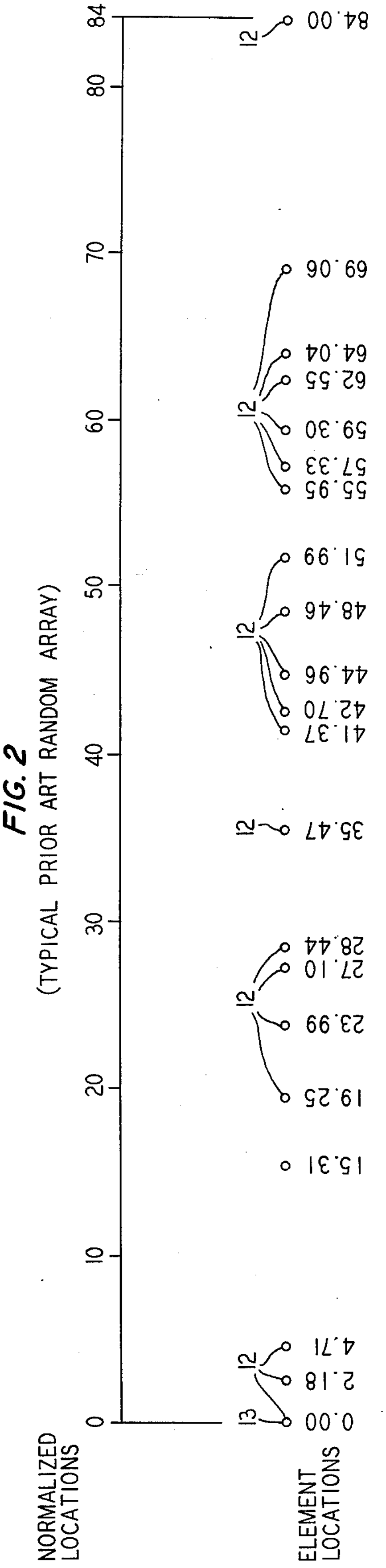
FIG. 2 is a diagrammatic illustration of a prior art linear array element location grid with the elements typically positioned in the grid in a purely random manner.

A typical prior art arrangement for a thinned linear phased antenna array with reasonably improved peak sidelobe level (PSL) control is the random array. In the random array the selection of the set of element locations 12 is accomplished by the use of a random selection method such as, for example, by selection of a set from a table of random numbers. An example of a random array is $$D \equiv D_R = \{0.00, 2.18, 4.71, 15.31, 19.25, 23.99, 27.10, 28.44, 35.47, 41.37, 42.70, 44.96, 48.46, 51.99, 55.95, 57.33, 59.30, 62.55, 64.04, 69.06, 84.00\}, \quad (4)$$

the layout of which is shown in FIG. 2. For this random array, $\nu = 85$, as with the "filled" array mentioned hereinbefore, and $k = 21$ for a thinning factor, $\beta$, of approximately one-quarter. The entries in $D_R$ in Equation (4) above were generated by a computerized random number generator according to a uniform distribution. The only restrictions used were that (a) element locations were forced to appear at locations 0 and 84 to maintain aperture 11, and (b) no two elements are spaced closer than a half wavelength apart. For random arrays it is well known that the average sidelobe level (ASL) is equal to 10 log $1/k$ dB and that the peak sidelobe level (PSL) in a typical random array will exceed the ASL by an amount shown approximately by the curve in FIG. 4 designated "random arrays".

In a linear aperiodic array in accordance with the present invention, a particular set $D_d$ of $k$ array element locations is also described in accordance with Equation (1). However, in contrast to the random array described hereinbefore, the element locations, $d_i$, of set $D_d$ always have integer values. Additionally, a property of set $D_d$ is that for any integer $\alpha$ where $0<\alpha<(\nu-1)$, the equation $$d_i - d_j = \alpha \pmod{\nu}, \quad (5)$$

where, as indicated, the differences are to be taken modulo $\nu$, and the Equation (5) has exactly $\Lambda$ solution pairs $(d_i, d_j)$ from the set of integers $D_d$. Sets of integers having this property are known as "difference sets" and an array having element locations defined in accordance with a difference set will hereinafter be called a "difference set array" (DSA).

Figure 4:
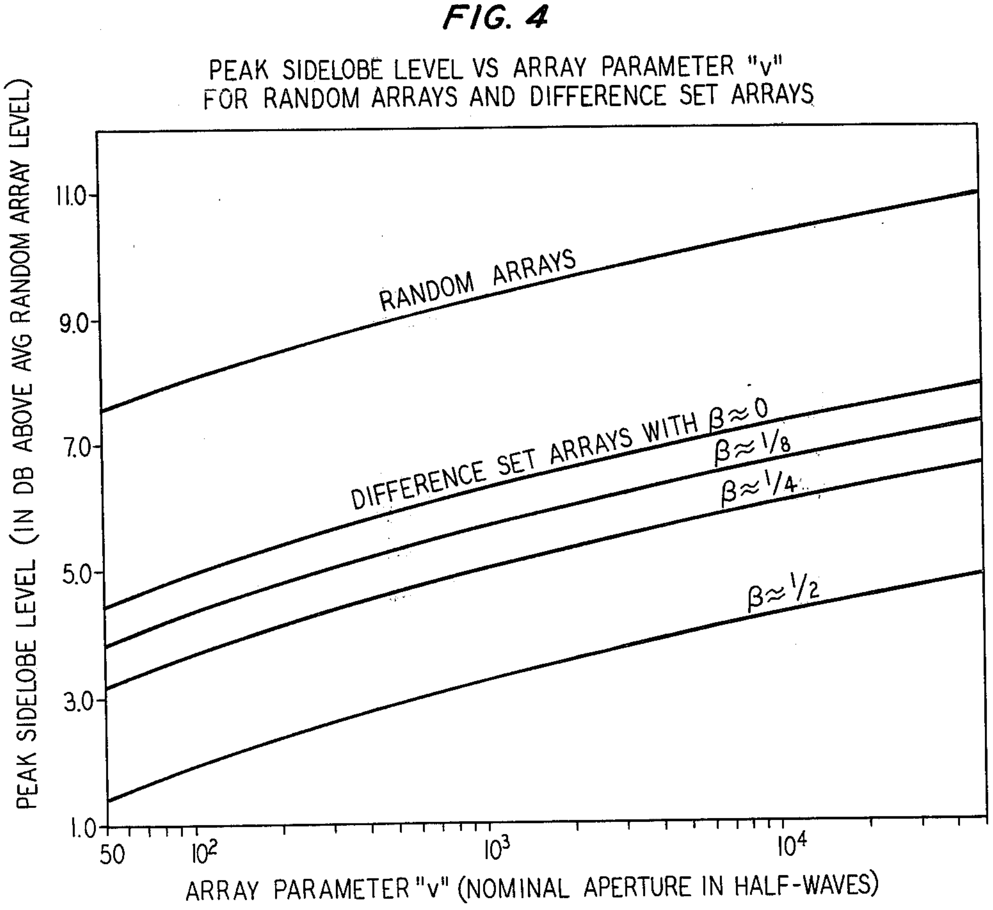
FIG. 4 illustrates curves for the typical peak sidelobe level versus the nominal aperture in half-waves for both the prior art random arrays and the difference set arrays in accordance with the present invention.
Figure 3:
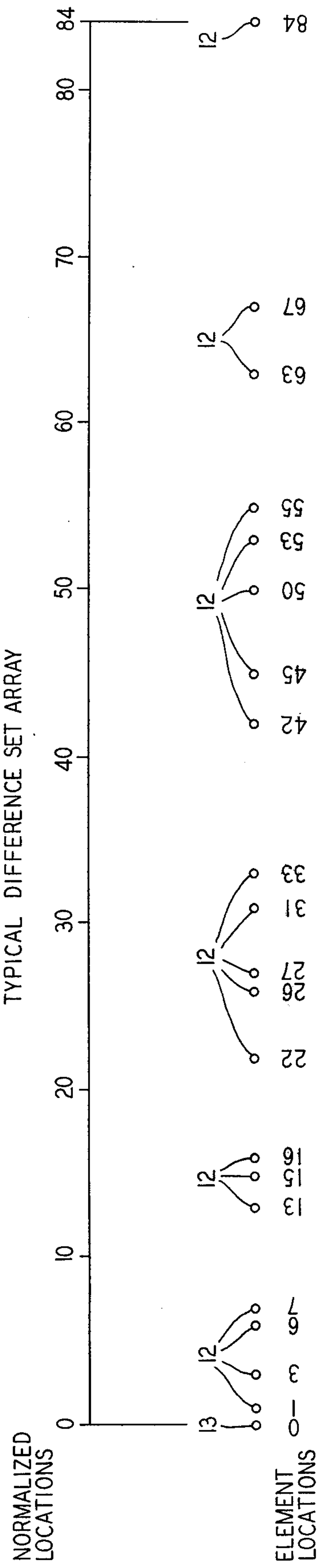
FIG. 3 is a diagrammatic illustration of a linear array element location grid with the elements positioned typically in the grid in accordance with the present invention.
Figure 5:
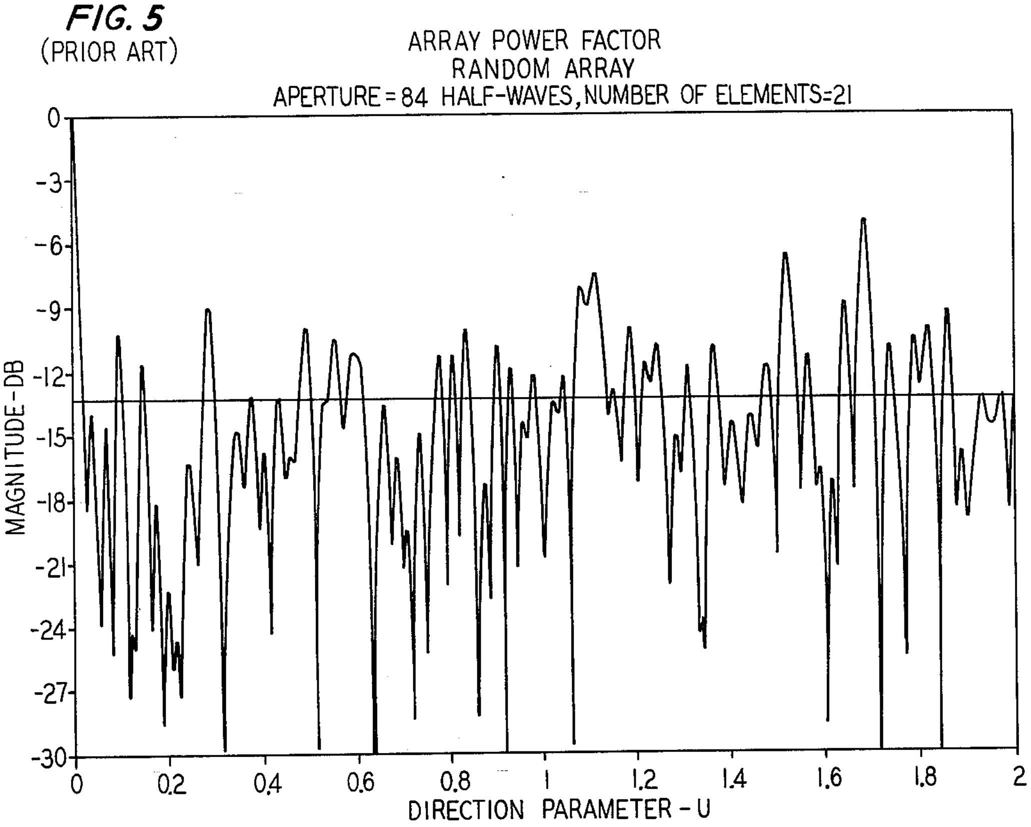
FIG. 5 (PRIOR ART)
FIG. 5 shows the power pattern for the prior art random array of FIG. 2.
Figure 6:
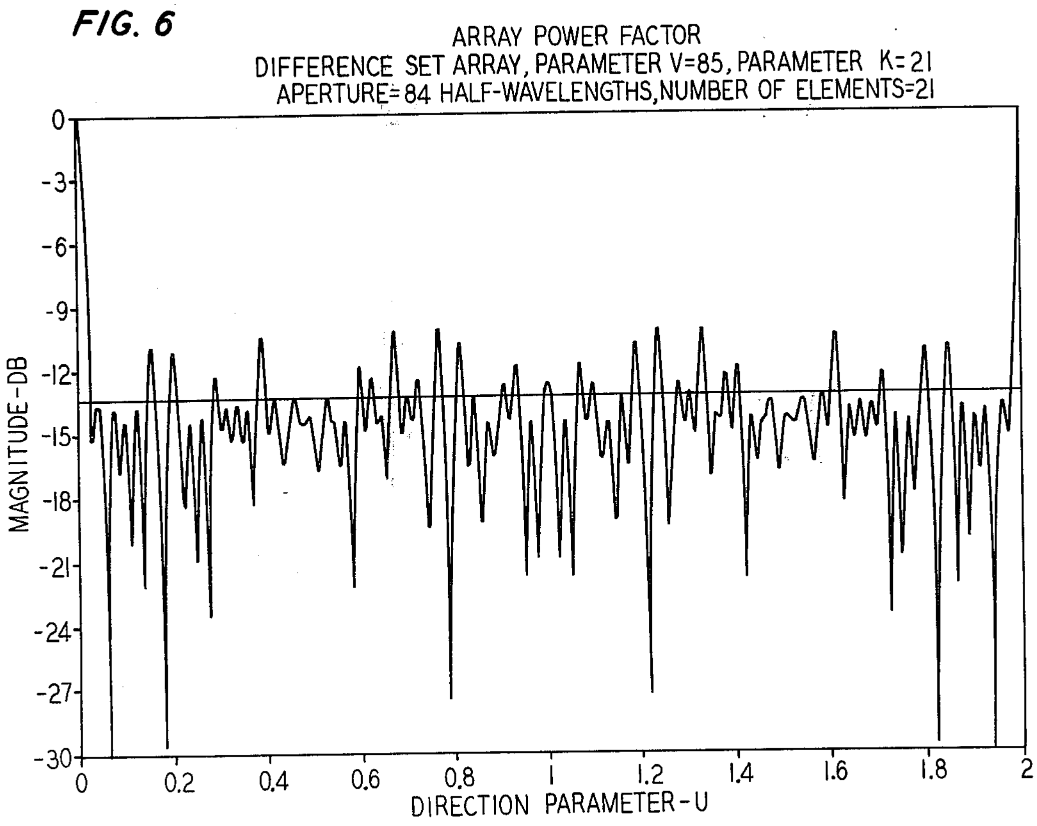
FIG. 6 shows the power pattern for the difference set array shown in FIG. 3 in accordance with the present invention.

An example of a DSA wherein $k = 21$, $\nu = 85$ and $\Lambda = 5$ is $$D_d = \{0, 1, 3, 6, 7, 13, 15, 16, 22, 26, 27, 31, 33, 42, 45, 50, 53, 55, 63, 67, 84\} \quad (6)$$

the layout of which is shown in FIG. 3. This DSA can be compared with the random array defined by Equation (4) and shown in FIG. 2 since both arrays have $k = 21$ and $\nu = 85$. Array power patterns for the arrays shown in FIGS. 2 and 3 are shown in FIGS. 5 and 6, respectively. For reference purposes, a solid line is shown in FIGS. 5 and 6 at 10 log $1/21 = -13.2$ dB, the average sidelobe level for the random array. The curve of the power pattern shown in each of FIGS. 5 and 6 is generated from the squared magnitude of $f(u)$, where $f(u)$ is given by the equation $$f(u) = \sum_{i=1}^{k} e^{j\pi u d_i} \qquad (7)$$

and where $j = \sqrt{-1}$ and $u = \sin\theta - \sin\theta_0$ and is the direction parameter for the array with $\theta$ being the angle measured from the array normal and $\theta_0$ being the beam steering angle. When comparing the curves of FIGS. 5 and 6 it can be seen that for these illustrative examples the DSA provides an improvement in the peak sidelobe level of nearly 5 dB. This value is substantially the same as that indicated in FIG. 4 between the random array where $v = 85$ and the difference set array where $v = 85$ and $\beta = \frac{1}{4}$ where an improvement of approximately 4.5 dB is indicated. From FIG. 4 it can be seen that the difference set array (DSA) provides thinned arrays with significantly better peak sidelobe level control than provided by the random array. As shown in FIG. 4, the average improvement to be obtained with the DSA over the random array is approximately 3 to 6 dB depending on the value of $\beta$ chosen. It is to be understood that in FIG. 4, the peak sidelobe levels indicated by the several curves shown therein are referenced to the random array average sidelobe level of 10 log $1/k$ dB. In addition, since small values of $k$ represent numerically degenerable cases, the improvement indicated by FIG. 4 applies most accurately to arrays containing at least 20 elements, that is, $k \geqq 20$.

As shown in Chapter 7 of the book *Principles of Aperture and Array System Design,* by B. D. Steinberg (New York: John Wiley & Sons, 1976), prior attempts at obtaining thinned arrays with improved peak sidelobe level (PSL) control did little better than the random array and often required extensive computations even for small arrays. The present DSA's, however, achieve significant improvements over the random arrays with no computation since extensive tables of difference sets already exist. In this regard see, for example, the book *Cyclic Difference Sets,* by L. D. Baumert (New York: Springer-Verlang, 1971) and the articles "Synthesis of Optimum Pulsed Sequences Having the Property of 'No More than One Coincidence'" and "Table of Optimal Sets with the Property of 'No More than One Coincidence'" by M. B. Sverdlik et al in *Radio Engineering and Electronic Physics,* Vol. 19, No. 4, April 1974, pp. 46–54 and Vol. 20, No. 6, June 1976, pp. 148–150, respectively.

Figure 7:
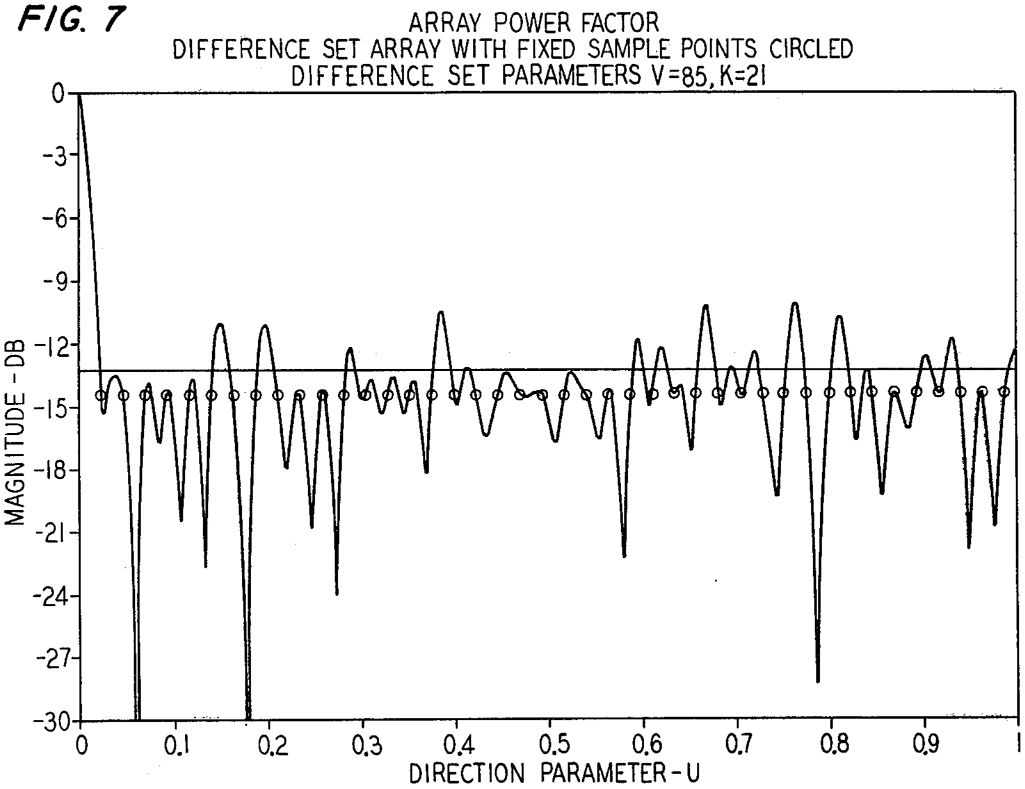
FIG. 7 shows a portion of the power pattern of FIG. 6 and the fixed sample point property of difference set arrays.

For purposes of clarity, the following heuristic discussion in conjunction with FIG. 7 will explain the ability of DSA's to provide improved PSL control. FIG. 7 is identical to FIG. 6 except that (a) the power pattern is only shown for $u = 0$ to $u = 1$ to improve the detail since the pattern of FIG. 6 is symmetric about $u = 1$, and (b) a circle is drawn around the power pattern at fixed intervals where the intervals have spacings of $2/v$ or 2/85 for the exemplary array. It is to be noted that the power pattern ordinate for each of the circled points has the same value. It has been found that only the difference set array, as defined hereinbefore, will have its power pattern pass through a fixed constant ordinate value at equally spaced intervals of $u_{int} = 2/v$. The ordinate value will always be $$10 \log 1/k\,[1 - {}^{(k-1)}/_{(v-1)}] \text{ dB},$$

which is a value smaller than the average sidelobe level (ASL) for random arrays. Additionally, as illustrated by the example in FIG. 7, the power pattern can attain no more than one peak or one nadir between each pair of fixed sample points. Because these sample points are constant and at a low level and because the pattern must return to a fixed sample point at every interval of $u_{int} = 2/v$, the likelihood that the power pattern can achieve a large peak sidelobe level is naturally restricted. The average improvement in peak sidelobe level offered by difference set arrays over random arrays is indicated in FIG. 4.

The description hereinabove has been related primarily to the linear difference set array. The present invention, however, can be similarly applied to form both planar and three-dimensional difference set arrays by constructing such arrays from a plurality of linear difference set arrays.

One such planar difference set array in accordance with the present invention can be formed by placing a first difference set $D_{d_1}$ along the horizontal coordinate of the planar array grid and a second difference set $D_{d_2}$ along the vertical coordinate of the planar array grid. It is to be understood that $D_{d_2}$ may have the same or different values for $k$, $v$ and $\Lambda$ as $D_{d_1}$ has, and can even be a "filled" array. To produce the planar difference set array, an element is located within the planar grid at each crosspoint location where both $D_{d_1}$ and $D_{d_2}$ have an element location indicated.

Figure 8:
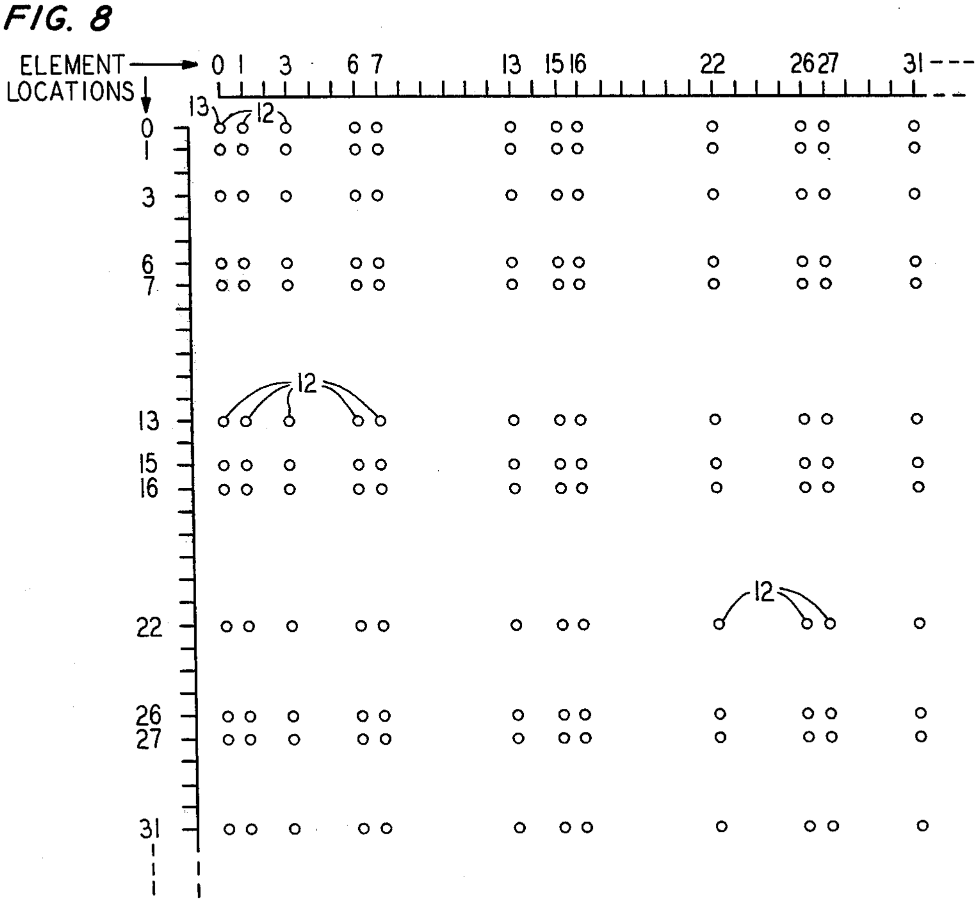
FIG. 8 is a diagrammatic illustration of a portion of a difference set planar array element location grid and the element placement in accordance with the present invention.

For exemplary purposes, FIG. 8 shows a portion of a particular planar difference set array between normalized locations 0 to 31 which is formed in accordance with the present invention, where $D_{d_1}$ and $D_{d_2}$ each use the same difference set equation as indicated in Equation (6). There, the element locations for $D_{d_1}$ and $D_{d_2}$ are indicated along the horizontal and vertical coordinates, respectively, of the planar array grid. As stated hereinabove, the planar difference set array is formed by placing an element at each cross-point location where both $D_{d_1}$ and $D_{d_2}$ have an element location indicated. For the assumed example, elements 12 are located in FIG. 8 within rows 0, 1, 3, 6, 7, 13, 15, etc. at the horizontal normalized locations 0, 1, 3, 6, 7, 13, 15, etc. To form other planar difference set arrays, $D_{d_1}$ and $D_{d_2}$ can use either the same difference set equation or different difference set equations wherein $k$, $v$ or $\Lambda$ may each have the same or different values.

Another planar difference set array (DSA) arrangement in accordance with the present invention can be formed by placing elements in the first row (Row 0) of the planar array as specified by a particular difference set $D_{d_0}$ and then by constructing the subsequent rows as specified by sequential cyclic shifts of that same difference set $D_{d_0}$. It is to be understood that a cyclic shift of a linear DSA ($D_{d_0}$) with parameters $v$, $k$ and $\Lambda$ is itself a linear DSA ($D_{d_1}$) with the same parameters which is constructed by adding to each element location in $D_{d_0}$ any integer $n$, where $n$ is prime to $v$, and then reducing each resulting element location modulo $v$. For example, an $n = 1$ cyclic shift of the DSA $D_{d_0} = \{0, 2, 8, 12\}$ having the parameters $v = 13$, $k = 4$, $\Lambda = 1$ results in the DSA $D_{d_1} = \{0, 1, 3, 9\}$. The element location "0" in $D_{d_1}$ is obtained by adding 1, the value of $n$, to element location 12 in $D_{d_0}$ and then transposing that value 13 to the equivalent element location 0 since $v = 13$ in the present example.

Figure 9:
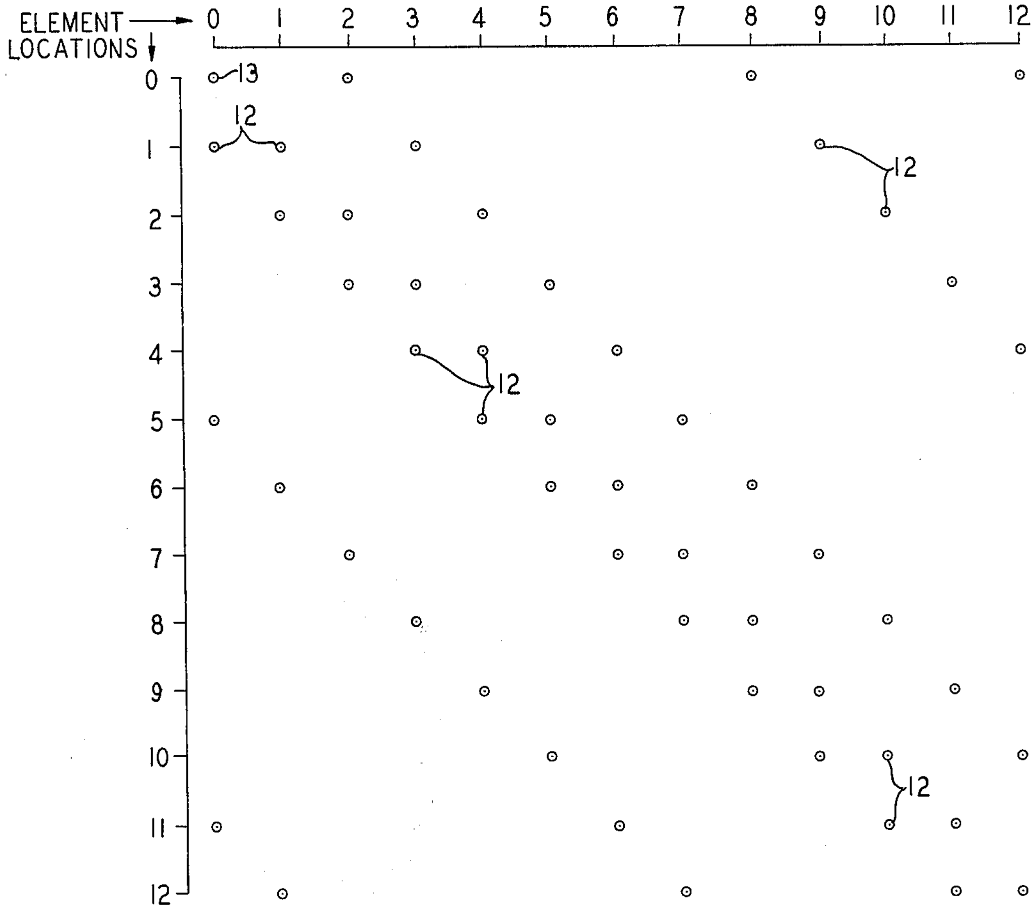
FIG. 9 is a diagrammatic illustration of another typical planar array element location grid and the element placement in accordance with the present invention.

FIG. 9 shows a planar DSA in accordance with this latter example in which the first row (Row 0) of the planar DSA is the linear DSA with the element locations $D_{d_0} = \{0, 2, 8, 12\}$, the second row (Row 1) is the $n = 1$ cyclic shift linear DSA $D_{d_1} = \{0, 1, 3, 9\}$, and the $m^{th}$ row is the $n = m$ cyclic shift linear DSA $D_{d_m} = \{0+m, 2+m, 8+m, 12+m\}$ where the element locations are taken modulo $\nu$.

The three-dimensional difference set array is merely an extension of the two methods described hereinabove for forming planar DSA's. With regard to the planar DSA described in association with FIG. 8, a third difference set equation ($D_{d_3}$) is used in conjunction with $D_{d_1}$ and $D_{d_2}$ to extend the planar DSA into a three-dimensional DSA. With regard to the cyclic shift planar DSA described in association with FIG. 9, cyclic shifts of a linear DSA can be extended into a third dimension to form a three-dimensional DSA.

It is to be understood that the above-described embodiments are simply illustrative of the principles of the invention. Various other modifications and changes may be made by those skilled in the art which will embody the principles of the invention and fall within the spirit and scope thereof. For example, the planar or three-dimensional arrays can use for $D_{d_1}$, $D_{d_2}$, or $D_{d_3}$ the equation for the "filled" array which might be considered as a special case of the difference set equation where $k = \nu$.

What is claimed is:

1. A thinned aperiodic antenna array with improved peak sidelobe level control comprising:

a plurality of antenna elements disposed in a linear array at locations having spacings which are both integer multiples of a predetermined distance and members of a set of integers $D = \{d_1, d_2, \ldots, d_k\}$, said set of integers D being determined in accordance with the equation for difference sets as given by $$d_i - d_j = \alpha \text{ (modulo } \nu\text{)},$$

where $\nu$ is an integer and is greater than $k$ and for an integer $0<\alpha<(\nu-1)$ said equation has exactly $\Lambda$ solution pairs in said set of integers D and $\Lambda$ is an integer and is less than $k$.

2. A thinned aperiodic antenna array according to claim 1 wherein the array is a planar antenna array constructed from a plurality of linear difference set arrays, said planar array having a first and a second coordinate normal to each other and the array comprises a second plurality of antenna elements disposed in the planar array at cross-point locations as defined by the integers $d$ of said set of integers D located along the first coordinate and the integers $d$ of a second set of integers $D_1$ located along the second coordinate, said second set of integers $D_1 = \{d_{1_1}, d_{2_1}, \ldots, d_{k_1}\}$ being also determined in accordance with said equation for difference sets.

3. A thinned aperiodic antenna array according to claim 2 wherein said set of integers D and said second set of integers $D_1$ are the same set of integers with the same parameters $\nu$, $k$ and $\Lambda$.

4. A thinned aperiodic antenna array according to claim 2 wherein said set of integers D and said second set of integers $D_1$ are different sets of integers comprising either one of the same and different values for the parameters $\nu$, $k$ and $\Lambda$.

5. A thinned aperiodic antenna array according to claim 2 wherein the array is a three-dimensional array constructed from said first and a second plurality of linear difference set arrays, said three-dimensional array including a third coordinate normal to said first and second coordinates and a third plurality of antenna elements disposed at cross-point locations defined by the integers $d$ in said sets of integers D and $D_1$ and a third set of integers $D_2$ located along said third coordinate, the third set of integers $D_2 = \{d_{1_2}, d_{2_2}, \ldots, d_{k_2}\}$ being also determined in accordance with said equation for difference sets.

6. A thinned aperiodic antenna array according to claim 1 wherein the array is a planar antenna array constructed from a plurality of linear difference set arrays, said planar array having rows and columns which have spacings which are integer multiples of said predetermined distance and said plurality of linear difference set arrays are arranged in said rows such that the $m^{th}$ row has a linear difference set array which is an $n = m$ cyclic shift of the linear difference set array D in the first row of the planar array, where said $n = m$ cyclic shift of the linear difference set array with normalized element locations given by said set of integers $D = \{d_1, d_2, \ldots, d_k\}$ is another linear difference set array with normalized element locations given by a set of integers $D_m = \{d_1+m, d_2+m, \ldots, d_k+m\}$, said locations to be reduced modulo $\nu$.

7. A thinned aperiodic antenna array according to claim 6 wherein the array is a three-dimensional array constructed from said first plurality of linear difference set arrays, said three-dimensional array including a third coordinate normal to said first and second coordinates and a second plurality of antenna elements disposed in rows along said third coordinate such that the $m^{th}$ row has a difference set array which is an $n = m$ cyclic shift of the linear difference set array D in the first row of said planar array given by said set of integers $D_m$.

* * * * *